Patented June 3, 1930

1,761,893

UNITED STATES PATENT OFFICE

WILHELM MEISER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF UREA

No Drawing. Application filed February 17, 1927, Serial No. 169,134, and in Germany February 19, 1926.

In the production of urea on a commercial scale, solutions of moderate concentration are cooled in cooling vessels, this method producing handsome needle shaped crystals which are easily handled and spread and are therefore greatly appreciated by farmers. Another method consists in allowing very highly concentrated solutions, containing 10 per cent or less of water, to solidify, either by pouring them into moulds and afterwards grinding the mass, or by spraying them into the air or the like. This last named method furnishes round granules, which are also easily spread.

The first named method has the drawback that the resulting needles are very liable to adhere together and to the walls of the vessel, so that the cooling effect rapidly diminishes and a good deal of manual labour has to be employed; whilst the second named method entails the use of such highly concentrated solutions of urea that the same are liquid only at temperatures at which an appreciable decomposition of urea to carbonate of ammonia is liable to occur. Careful attention is therefore necessary to restrict the duration of heating and the temperature as much as possible. For example, the solidification points of solutions of pure urea are as follows:—87 per cent solution, 95° C.; 90 per cent, 107° C.; 95 per cent, 120° C.; and so on; whereas the hydrolytic decomposition of urea into carbonate of ammonia occurs, to an appreciable extent at 80° C., and rapidly increases as the temperature rises.

I have now found that the highly appreciated needle-shaped crystals may be readily produced by breaking up moderately concentrated solutions into the form of drops and exposing them to slow cooling in a current of a gaseous drying medium such as air or other suitable gases. The object in this case is not to cool the entire mass rapidly, which leads to the formation of round granules, but to effect a gradual cooling of the solutions, thereby giving the crystals time to develop definite needles within the liquid. Consequently it is advisable to use, in place of such highly concentrated solutions as above mentioned, any solutions of urea which contain by weight more than 50, but less than 90 per cent thereof. It is essential that the path traversed by the drops should be as lengthy as possible, and that they should not be cooled too quickly with cold air. This object is achieved by the partial employment of preheated air, or by a suitable application of the counterflow principle.

The following example will further illustrate how the said invention may be carried into practical effect but the invention is not limited to the example.

Example

A solution containing 70 per cent of urea is run in at the top of a tower 20 metres in height, and broken up into drops, which should not be too small, by any known means such as sprayers, nozzles, rotary discs or the like. At the same time an upward draught of air or gas is established by suction or blowing, and the rate of flow of this current should be so regulated that the descending drops are not completely cooled until they reach the lowest zone. For this purpose, if necessary, warmed air is admitted into the upper end of the tower, and cold air at only the lower end. This provision will be superfluous if the relative proportions of solution and air are properly adjusted, since the ascending air will be warmed automatically by the descending hot solution. In order to maintain the drops longer in suspension and thus lengthen the period of crystallization, it is advisable to impart a circular movement to the air, by admitting it tangentially. The high tower may, of course, be replaced by a low chamber of sufficient dimensions, into which the urea solution is injected horizontally, or at a suitable upward angle, so as to obtain the longest possible trajectory. In this case, the air supply can be easily regulated by a blower, or by natural draught with louvres or shutters at the side or below. The breaking up of the solution into drops can be effected by means of compressed air or steam, or by causing a current of air or the like, admitted below, to impinge upon the solution entering the chamber.

According to the concentration of the original solution employed, a pulp of varying viscosity collects on the bottom of the chamber and is fed, by means of worms, scrapers, or the like, to a filter apparatus, centrifuge, aspirator drum or the like in order to separate the crystal needles from the adherent mother liquor. If strong solutions of urea be employed, the damp mass of crystals may, in some cases, be passed direct into a drying apparatus, for the purpose of expelling the residual water.

I claim:

1. The process of manufacturing urea in the shape of crystalline needles which comprises breaking up warm solutions of urea containing more than 50, but less than 90 per cent, by weight, thereof into drops and allowing them to cool slowly in a gaseous drying medium.

2. The process of manufacturing urea in the shape of crystalline needles which comprises breaking up warm solutions of urea containing more than 50, but less than 90 per cent, by weight, thereof into drops and allowing them to cool slowly first in a heated gaseous drying medium and then in a cold one.

3. In the manufacture of needle-shaped crystals of urea by breaking up warm solutions of urea containing between 50 and 90 per cent thereof into drops and allowing the latter to cool slowly in a gaseous drying medium which is heated by the drops by application of the counter-flow principle.

4. In the manufacture of needle-shaped crystals of urea by breaking up warm solutions of urea containing more than 50, but less than 90 per cent thereof into drops and allowing the latter to cool slowly in a gaseous drying medium, the step of introducing the drops at the top of a drying space and the gas near its bottom regulating the current of gas so that the descending drops are not completely cooled until they reach the bottom of the said space.

5. In the manufacture of needle-shaped crystals of urea by breaking up warm solutions of urea containing more than 50, but less than 90 per cent thereof into drops and allowing the latter to cool slowly in a gaseous drying medium, the step of introducing the drops at the top of a drying space and tangentially admitting warm gas between its upper end and the bottom and cold gas near the bottom of the said space.

In testimony whereof I have hereunto set my hand.

WILHELM MEISER.